United States Patent [19]

Alexander

[11] Patent Number: 5,349,470
[45] Date of Patent: Sep. 20, 1994

[54] SPOKED WHEEL REFLECTIVE VEST FOR BICYCLES AND THE LIKE

[76] Inventor: Keith L. T. Alexander, 2503 Packard Rd. "Q", Anne Arbor, Mich. 48104

[21] Appl. No.: 143,935

[22] Filed: Oct. 27, 1993

[51] Int. Cl.⁵ .............................................. G02B 5/12
[52] U.S. Cl. ..................................... 359/523; 40/587; 116/46
[58] Field of Search ....................... 359/520, 522, 523; 116/28 R, 46–49; 40/541, 582, 587, 591

[56] References Cited
U.S. PATENT DOCUMENTS

| | | |
|---|---|---|
| 3,901,554 | 8/1975 | Kennedy . |
| 4,037,924 | 7/1977 | May ........................................ 359/523 |
| 4,209,230 | 6/1980 | Perkins . |
| 4,285,573 | 8/1981 | Stone ....................................... 359/523 |
| 4,434,801 | 3/1984 | Jiminez et al. . |
| 4,648,694 | 3/1987 | Bean . |
| 4,796,972 | 1/1989 | Thomas et al. ........................ 359/523 |

Primary Examiner—Loha Ben
Assistant Examiner—James Phan
Attorney, Agent, or Firm—Leydig, Voit & Mayer, Ltd.

[57] ABSTRACT

A spoked wheel mountable safety device in the form of a highly light reflective fabric type material which is semicircular in shape in its flat form and has velcro type fasteners so that when the device is folded upon itself and secured together about the wheel spokes so that it provides a pie slice shaped reflective covering located between the hub and rim of the spoked wheel.

8 Claims, 1 Drawing Sheet

SPOKED WHEEL REFLECTIVE VEST FOR BICYCLES AND THE LIKE

BACKGROUND OF THE INVENTION

The present invention relates generally to spoked wheel reflector devices, and more particularly, to an easily applied, highly visible reflective partial covering for a spoked wheel of a bicycle or the like. The preliminary form of my invention was disclosed in Disclosure Document No. 338,086, filed in the United States Patent and Trademark Office on Aug. 16, 1993 for "Bicycle Spoked Wheel Reflective Vest."

DESCRIPTION OF THE PRIOR ART

It has long been recognized and even required that bicycles either contain reflectors on the spokes of each wheel, or equivalents. Numerous attempts have been made to provide all types of different reflective devices that may be attached to the spoked wheel of a bicycle. Examples of the diversity of different types of devices may be seen in the following representative issued U.S. Patents:

| U.S. Pat. No. | Issue Date |
| --- | --- |
| 4,209,230 | 06/24/90 |
| 4,285,573 | 08/25/81 |
| 3,901,554 | 08/26/75 |
| 4,434,801 | 03/06/84 |
| 4,648,694 | 03/10/87 |
| 4,676,595 | 06/30/87 |
| 4,470,663 | 09/11/84 |

While such devices may have provided fulfillment of the necessary requirements for having safety reflectors, each suffers some kind of drawback, such as the complexity or difficulty in mounting the device, costliness of the device, or being limited in its providing sufficient visual awareness at an early enough time for motorists to avoid the bicyclist in dark road areas, for example.

OBJECTS AND SUMMARY OF THE INVENTION

Accordingly, it is a primary object of this invention to provide an improved and easily applied safety device which is relatively low in cost and has a large area of reflective capability to enhance visibility for motorists awareness of a cyclist. It is another object of the present invention to provide a simply attachable and removable reflective safety device for spoked wheels which can be easily carried about by the cyclist and applied or removed even for cleaning. It is another yet related object of the present invention to provide a spoked wheel reflective partial covering that is also readily adaptable to receive names, logos or designs without diminishing the safety aspect of a highly accentuated nighttime reflector.

In general, the present invention contemplates a safety device in the form of a highly light reflective fabric type material which is preferably semicircular in shape with a semicircular cutout on the major diameter and with the inside having properly located fastener means such as the velcro type hook and loop fasteners that enable the cover to be folded upon itself and secured together so that when attached to the spoked wheel of a bicycle, the cover forms a pie slice shaped reflective covering located between the hub and rim. The device provides a fairly large light reflective area dynamically presented on the turning wheel for increased safety of the rider. The enhanced or larger reflective surface area may include names, logos or designs without diminishing the enhanced reflectivity of the device that covers on the order of or approximately a quarter of the spoked wheel area.

These and other features and advantages of the invention will be more readily apparent upon reading the following description of the preferred exemplified embodiment of the invention and upon reference to the accompanying drawings therein.

DETAILED DESCRIPTION OF THE INVENTION

Figure 1:
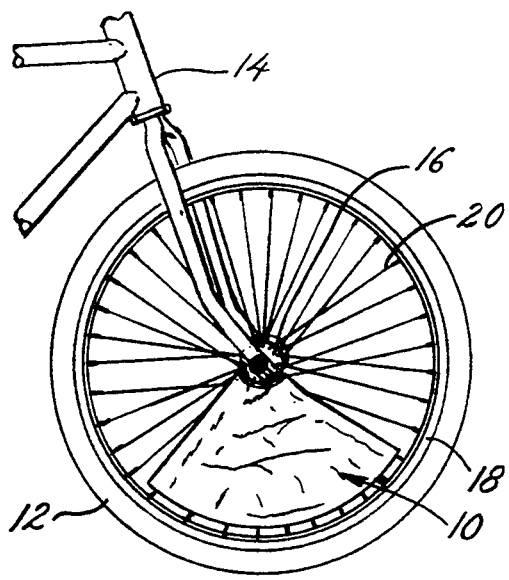
FIG. 1 is a partial view of an exemplary bicycle spoke wheel showing the reflective vest device of the invention applied to the front wheel thereof.

Turning to the drawings, there is shown in FIG. 1, the installed, exemplary reflective safety vest or device generally indicated at 10, on the front spoked wheel 12 of a bicycle 14. The reflective safety device 10 as installed on the circular spoked wheel 12 is positioned between the wheel hub 16 and the rim 18. As mounted to the spokes 20 of wheel 12, the reflective safety device 10 covers spokes on one side and alternate spokes on the other side radiating from one side of the hub side in approximately one quadrant area of a total wheel circumference. It will be understood as the discussion proceeds that the present reflective safety device, in addition to being used with conventional two wheel bicycles, may also be applied to any other type of vehicle employing a spoked wheel construction.

Figure 2:
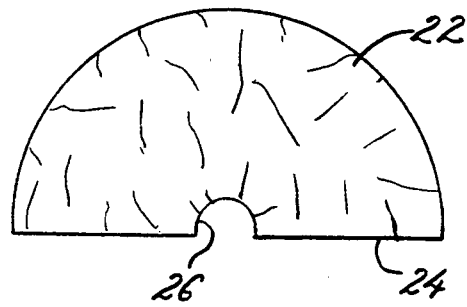
FIG. 2 is a plan view of the reflective vest device of the invention from the outside surface and in its unfolded, flat condition.
Figure 3:
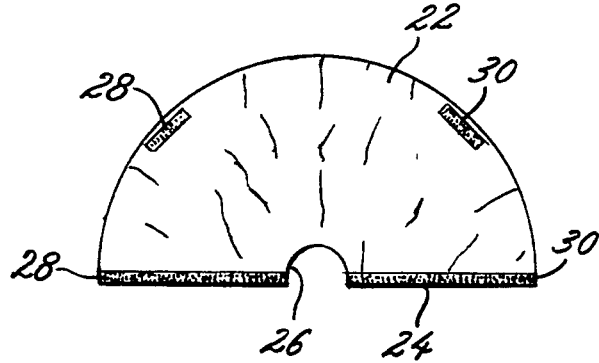
FIG. 3 is a plan view of the inside of the reflective vest as shown in FIG. 2, here illustrating the fastening devices.

In accordance with one of the features of the present invention, as shown in FIG. 2 in its unfolded, flat condition, there is provided a flexible semicircular highly light reflective sided base member 22. The flexible base member 22 is preferably formed of a light reflective fabric material such as that known as SCOTCHLITE ™ #8910 silver, manufactured by the 3-M Company of St. Paul, Minn. in which, according to specifications, has a light reflectivity or brightness rating on the order of 500 candle power lumens (CPL).

It should be recognized, however, that other of such reflective fabrics in different colors and other brightness ratings may likewise be used with my invention.

Figure 4:
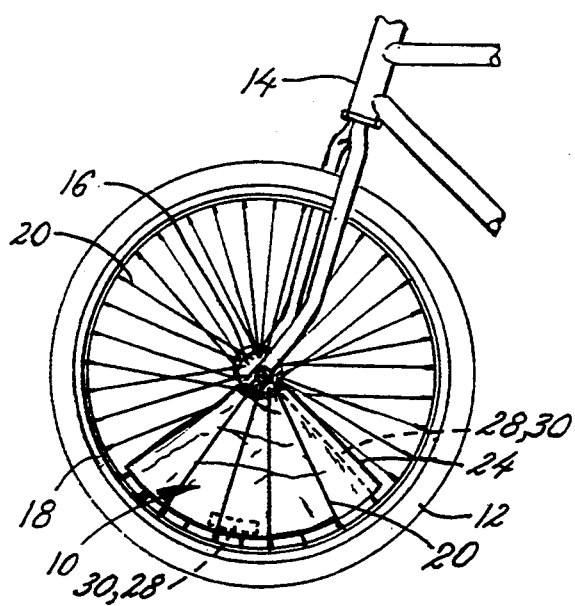
FIG. 4 is a partial view as in FIG. 1, here showing the opposite side of the spoked wheel with the reflective safety vest in place.

Approximately at the center of the greater diameter 24 of the semicircular base member 22, there is provided a semicircular cut out 26 which will accommodate the hub 16 of spoke wheel 12. The radius of the semicircular base member is approximately that of the wheel spoke length. On the opposite side of the base member, along its peripheral edges, there are provided at respective symmetrical sides, velcro type hook and loop fastening strips 28, 30, arranged such that when the base member 22 is folded upon itself, it defines a pie slice shaped structure held together by the fastening strips. The reflective surface will be on the outside of one side of the spokes 20 which are covered as shown in FIG. 1. The other side of the wheel as shown in FIG. 4 will preferably have just the alternating spokes which radiate from one side of the hub 16 covered. The inside of the base member may be lined if so desired. With the arrangement of the reflective safety device attached to a spoked wheel, a relatively large area of highly reflective surface is provided and due to the dynamic reflection with the wheel turning, there is an enhancement of the picking up of any light from auto headlights at substantial distances which is highly desirable for dark road areas.

The use of reflective fabric and the present configuration, enables the user to quickly apply the reflective safety device 22 to the bicycle wheel as well as to remove the device for transporting it apart from the bicycle, such as may be desired for cleaning it or even to use with various different bicycles.

In addition, the fabric reflective surface can be easily printed upon by silkscreen or other techniques for applying names, logos or designs and with the relatively large area provided, there is no diminution of the safety aspect of a highly accentuated nighttime reflector.

I claim:

1. A safety reflective device for use with a spoked wheel assembly having spokes axially spaced around a hub and extending radially to a rim and tire assembly comprising:

a flexible semicircular base member having a highly light reflective side, said light reflective side being the outside, the inside of said base member carrying fastening means disposed at outer edges such that when the base member is folded upon itself it forms a pie slice shaped covering located on the spoked wheel positioned between the hub and rim and said fastening means securing the base member together in about one quadrant-like area of said spokes.

2. A reflective safety device as claimed in claim 1 wherein the major diameter of said semicircular shaped base member contains a substantially centrally located semicircular cut-out.

3. A reflective safety device as claimed in claim wherein said base member is a light reflective fabric material.

4. A reflective safety device as claimed in claim 3 wherein said light reflective fabric material is lined.

5. A reflective safety device as claimed in claim 1 wherein said fastening means includes velcro type hook and loop fasteners.

6. A reflective safety device as claimed in claim 1 wherein at least one outer side portion of said light reflective side contains a logo-like display.

7. A reflective safety device as claimed in claim 1 wherein said light reflective side has a brightness rating of on the order of 500 candle power lumens.

8. A reflective safety device as claimed in claim 1 wherein said base member covers all spokes in the quadrant-like area on one side and alternating ones of the spokes on the other side of the wheel.

* * * * *